US011503500B2

(12) United States Patent
Kattemane Satyaganapati et al.

(10) Patent No.: US 11,503,500 B2
(45) Date of Patent: Nov. 15, 2022

(54) METHOD AND A USER EQUIPMENT (UE) FOR TRANSPORT LAYER OPTIMIZATION USING A PREEMPTIVE CROSS LAYER SIGNALING

(71) Applicant: Samsung Electronics Co., Ltd., Suwon-si (KR)

(72) Inventors: Pratibha Kattemane Satyaganapati, Bangalore (IN); Danish Ehsan Hashmi, Bangalore (IN); Vikash Balasubramanian, Bangalore (IN); Ankur Chauhan, Bangalore (IN); Sundeep Rajendra D'Costa, Bangalore (IN); Ramesh Chandra Vuppala, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 16/756,022

(22) PCT Filed: Nov. 27, 2018

(86) PCT No.: PCT/KR2018/014705
§ 371 (c)(1),
(2) Date: Apr. 14, 2020

(87) PCT Pub. No.: WO2019/107870
PCT Pub. Date: Jun. 6, 2019

(65) Prior Publication Data
US 2020/0314688 A1     Oct. 1, 2020

(30) Foreign Application Priority Data

Nov. 28, 2017   (IN) .............................. 201741042701
Nov. 2, 2018    (IN) .............................. 2017 41042701

(51) Int. Cl.
*H04W 28/06* (2009.01)
*H04L 1/18* (2006.01)
*H04W 28/10* (2009.01)

(52) U.S. Cl.
CPC .......... *H04W 28/06* (2013.01); *H04L 1/1812* (2013.01); *H04W 28/10* (2013.01)

(58) Field of Classification Search
CPC ....... H04L 1/1812; H04L 41/00; H04L 47/00; H04L 49/00; H04W 28/06; H04W 28/10
See application file for complete search history.

(56) References Cited

U.S. PATENT DOCUMENTS

2006/0133365 A1   6/2006  Manjunatha et al.
2010/0118876 A1   5/2010  Meyer et al.
(Continued)

FOREIGN PATENT DOCUMENTS

CN   101267443 A  *  9/2008
CN   102595599 A  *  7/2012   ........ H04W 72/1289
(Continued)

OTHER PUBLICATIONS

Samsung; PDCP data recovery for eLWA; 3GPP TSG-RAN WG2 Meeting #95bis R2-166287; Oct. 2, 2016; Kaohsiung, Taiwan.

*Primary Examiner* — Khoa Huynh
(74) *Attorney, Agent, or Firm* — Jefferson IP Law, LLP

(57) ABSTRACT

The embodiments herein achieve a method and a UE for enabling a transport layer optimization using a preemptive cross layer signaling. The method includes transmitting at least one information to the NR L2 receiver for the transport layer optimization for a data flow(s). The at least one information includes at least one of a configuration for requesting a buffer status of the NR L2 receiver, a policy to inspect data packets of the data flow(s), a configuration for enabling or disabling the transport layer optimization, a retransmission timeout (RTO) and a round trip time (RTT)
(Continued)

of the data flow(s), an impending RTO value of the data flow(s) and a threshold value of a buffer size. Further, the method includes enabling the transport layer optimization based on the at least one information received from the NR L3 receiver to avoid receiving of duplicate data packets from a TCP sender.

13 Claims, 8 Drawing Sheets

(56) References Cited

U.S. PATENT DOCUMENTS

| | | | |
|---|---|---|---|
| 2012/0155458 | A1 | 6/2012 | Larson et al. |
| 2014/0286313 | A1 | 9/2014 | Fu et al. |
| 2014/0314027 | A1 | 10/2014 | Marinier et al. |
| 2016/0056927 | A1 | 2/2016 | Liu et al. |
| 2019/0159274 | A1* | 5/2019 | Hong ............ H04W 28/085 |

FOREIGN PATENT DOCUMENTS

| | | | |
|---|---|---|---|
| JP | 2007-194760 A | | 8/2007 |
| KR | 2016046562 A | * | 4/2016 |

* cited by examiner

METHOD AND A USER EQUIPMENT (UE) FOR TRANSPORT LAYER OPTIMIZATION USING A PREEMPTIVE CROSS LAYER SIGNALING

CROSS-REFERENCE TO RELATED APPLICATION(S)

This application is a U.S. National Stage application under 35 U.S.C. § 371 of an International application number PCT/KR2018/014705, filed on Nov. 27, 2018, which is based and claimed priority of an Indian provisional patent application number 201741042701, filed on Nov. 28, 2017, and of an Indian complete patent application number 201741042701, filed on Nov. 2, 2018, filed in the Indian Intellectual Property Office, the disclosure of which is incorporated by reference herein in its entirety.

TECHNICAL FIELD

The present disclosure relates to wireless communication and more particularly related to a transport layer optimization using a preemptive cross layer signaling.

BACKGROUND ART

In the next generation cellular system i.e. fifth generation network (5G), modem New radio Layer 2 (NR-L2) (New radio Layer-Packet Data Convergence Protocol (NR-PDCP) and New radio Layer-Radio Link control (NR-RLC)) protocol is going through major modifications to incorporate the latest changes at the technology front and to provide the next generation services to users. Increase in the NR-L2 Sequence Number bit length (up to 18 bit) is one such change which enables a maximum of 2^17 data packets to be buffered at NR-L2 for a single bearer. This huge increase in the buffer size combined with increased reordering timer value at NR-PDCP (ranging from 0 ms to 3 s) can lead to large amount of data accumulation at NR-L2 buffers. The NR makes use of Millimeter (mm) Waves where radio signal conditions can drastically change within short span of time which does not give enough time for Transmission Control Protocol (TCP) to adapt to the newer radio conditions. Additionally, MEC (Mobile Edge Computing) is one of the essentials for 5G, which reduces the Round trip time (RTT) at transport layer significantly and provides ultra-low latency services to the user.

Further, combination of increased buffer size (owing to 18 bit SN at NR-PDCP), increased re-ordering timer, decreased RTT (for ultra-low latency applications) and usage of mm Waves in the 5G, results in redundant data retransmissions issue owing to TCP Congestion Control mechanism/RTT not being able to adapt to the dynamically changing mm Wave radio conditions.

In this context when the NR L2 layer is trying to recover missing packets (using ARQ) and a large number of data packets are accumulated at the NR L2 layer, it's likely that the Transport layer's RTO happens (at TCP sender) and this triggers retransmission of all the packets of which most of the packets were already received at the NR L2 layer. For the next generation networks this can lead to a serious performance problem impacting all key performance indicators (KPI's) like good throughput, latency, cost and power.

FIG. 1a is a sequence diagram illustrating an existing mechanism for recovering missing packets in a transport layer. The existing mechanism wherein an evolved Node B (eNodeB) (200) and a New Radio layer 2 (NR L2) (302) of a user equipment (UE) (300) can employ a selective automatic repeat request (ARQ) mechanism in the RLC AM to send/receive packet between them. A TCP server (100) sends packets 1~1000 to a NR L2 of the eNodeB (200) (S101). The NR L2 of the eNB (200) sends the packets 11000 but some of the packets e.g. packet 3 and 4 are missing (S103). Further, the RLC e.g. the NR L2 (302) of the UE can send received packets 1~1000 except packets 3 and 4 to a TCP/IP e.g. the TCP (304) of the UE (S105), if received in sequence, and the TCP (304) sends acknowledgments (ACKs) for packets 1~2 and 5~1000 to a TCP server (100) (S107). Further, there are chances that some of the packets e.g. packet 3 and 4 may not be received by the NR L2 (302). A transport control protocol (TCP) retransmission timeout (RTO) timer may be initiated. Further, the NR L2 (303) of the UE (300) can send a negative acknowledgment (NACK) for those missing packets when it receives higher sequence packet to the eNodeB (200) (S109). Further, the NR L2 of the eNodeB (200) can retransmit packet 3 and 4 for max number of time to recover the missing packets (S111). The TCP RTO timer may be expired. A sliding window protocol is used in the ARQ can have large window size in 5G (512x) so many packets 1~2, 1001~2000 already transmitted by the eNodeB (200) while recovering the missing packet which accumulated at the NR L2 (302) of the UE (300). There are high chances that the TCP RTO timer may occur at the TCP server (100) during this process. Therefore, the TCP server (100) may retransmit all the packets 3, 4 and 1001~2000 for which the TCP server (100) might not have received the ACK but in real the UE may have most of the packets e.g. packets 1~2, 5~1000 and 1001~2000 (S113).

FIG. 1b is an example representation of the existing mechanism for recovering missing packets in the transport layer. TCP sender receives ACK for packet N and sends packets till N+2000. Further, a network layer 2 (NW L2) sends N+1~N+2000 packets to the UE. The UE receives all the packets except N+1 and N+1000, due which NR L2 of the UE holds all the received packets at the NR L2 of the UE till it recovers the missing packets as shown in FIG. 1b (a). Further, the L2 of the network (NW) tries to resend the missing packets N+1 and N+1000 based on NACK information received from NR L2 of the UE before RTO of the TCP sender expires. However, the TCP sender only receives ACK for packet N, even though ACK for N+2000 packets available in the NR L2 buffer of the network as shown in FIG. 1b (b). Meanwhile, the TCP sender RTO expires and it retransmit all packets (N+1~N+2000). This results in duplication of the packets at TCP receiver as shown in FIG. 2.

FIG. 2 is a sequence diagram illustrating an existing mechanism for recovering missing packets in user datagram protocol (UDP). According to the existing mechanism, the NR L2 sender of the network sends packets N+2000 to NR L2 receiver of the UE out of which some of the packets are missing e.g. packet x and y (S201). Due which the NR L2 receiver of the UE initiates a recovery process by sending a NACK List for missing packet x and y (S203). The NR L2 sender of the network resend missing packets x and y based on the NACK List (S205). However, the NR L2 receiver of the UE holds all the received packet in buffer until sufficient recovery of missing packets happens. The UDP application has a timer threshold, beyond which the packets are useless. If the NR L2 is unable to recover missing packets before the UDP application threshold (S207), then all the packets delivered are discarded at application layer (S209). Thus, an entire buffer of packets is useless and discarded because all packet arrived at application after delay. This leading to disastrous performances and a bad user experience.

DISCLOSURE OF INVENTION

Solution to Problem

The principal object of the embodiments herein is to disclose methods and a User Equipment (UE) for transport layer optimization using a preemptive cross layer signaling.

Accordingly the embodiments herein provide a method for enabling a transport layer optimization using a preemptive cross layer signaling. The method includes transmitting at least one information to the NR L2 receiver for the transport layer optimization for a data flow(s). The at least one information includes at least one of a configuration for requesting a buffer status of the NR L2 receiver, a policy to inspect data packets of the data flow(s), a configuration for enabling or disabling the transport layer optimization, a retransmission timeout (RTO) and a round trip time (RTT) of the data flow(s), an impending RTO timer of the data flow(s) and a threshold value of a buffer size. Further, the method includes enabling the transport layer optimization based on the at least one information received from the NR L3 receiver to avoid receiving of duplicate data packets from a Transmission Control Protocol (TCP) sender.

In an embodiment, enabling the transport layer optimization based on the at least one information received from the NR L3 receiver includes determining the at least one information transmitted by the NR L3 receiver is the configuration for requesting the buffer status of the data flow(s) in the NR L2 receiver. Further, triggering the buffer status to the NR L3 receiver, on determining that the at least one information transmitted is the configuration for requesting the buffer status of the data flow(s). The buffer status includes at least one of information of available data packets, at least one missing data packet of the data flow(s) and timestamp information of the available data packets at the NR L2 receiver. The timestamp information of the available data packets is to maintain a Round trip time (RTT) consistency at the NR L3 receiver. Further, determining the at least one missing data packet based on the buffer status of the NR L2 receiver. Further, initiating an indication timer at the NR L3 receiver based on the determined at least one missing data packet and wait for the NR L2 receiver to recover the at least one missing data packet before the indication timer expires. Further, sending a selective acknowledgment (SACK) message request to the TCP sender to receive the at least one missing packet, if the at least one missing packet is not recovered before the expiry of the indication timer, wherein the SACK message request is sent only after the expiry of the indication timer based on the triggered buffer status of the NR L2 receiver. In an embodiment, the method further includes restarting by the NR L2 receiver the indication timer on triggering the buffer status to the L3 receiver. In an embodiment, the timestamp information of the available data packets is to maintain the RTT consistency at the NR L3 receiver.

In an embodiment, enabling the transport layer optimization based on the at least one information received from the NR L3 receiver includes determining the at least one information transmitted by the NR L3 is the RTO and the RTT of the data flow(s). Further, the method includes determining an indication timer (i.e., estimated possible expiry of the TCP RTO) for the data flow(s) based on the RTO and the RTT to recover at least one missing data packet in the data flow(s) before the expiry of the indication timer. Further, the method includes transmitting available data packets of the data flow(s) and the at least one missing data packet information to the NR L3 receiver after the expiry of the indication timer. Further, the method includes sending the SACK message request to the TCP sender to receive the at least one missing data packet from the TCP sender based on the available data packets and the at least one missing data packet information received from the NR L2 receiver.

In an embodiment, enabling the transport layer optimization based on the at least one information received from the NR L3 receiver includes determining the at least one information transmitted by the NR L3 receiver is the impending RTO value of the data flow(s). The impending RTO value indicates a threshold timer/indication timer of the RTO. Further, the method includes sending available data packets of the data flow(s) at the NR L2 receiver to the NR L3 receiver based on the impending RTO value received from the NR L3 receiver. Further, the method includes sending the SACK message request to the TCP sender to receive at least one missing data packet in the data flow(s) from the TCP sender based on the available data packets received from the NR L2 receiver. Further, the method includes restarting by the NR L3 receiver the threshold timer on sending the SACK message.

In an embodiment, enabling the transport layer optimization based on the at least one information received from the NR L3 receiver Includes determining the at least one information transmitted is the policy to inspect data packets of the data flow(s). Further, the method includes determining whether the data packets are TCP packets or UDP packets, on determining that the at least one information transmitted is the policy to inspect data packets of the data flow(s). Further, the method includes transmitting the available packets at the NR L2 receiver to the NR L3 receiver, on determining that the data packets are UDP.

In an embodiment, enabling the transport layer optimization based on the at least one information received from the NR L3 receiver. The method includes determining the at least one information transmitted is the threshold value of the buffer size. Further, the method includes transmitting the available packets at the NR L2 receiver to the NR L3 receiver, when the buffer status of the NR L2 receiver matches with the threshold value of the buffer size.

Accordingly the embodiments herein provide a UE for enabling a transport layer optimization using a preemptive cross layer signaling. The UE includes a New Radio layer (NR L3) receiver configured to transmit at least one information to a New Radio layer 2 (NR L2) receiver for transport layer optimization for a data flow(s). The at least one information includes at least one of a configuration for requesting a buffer status of the NR L2 receiver, a policy to inspect data packets of the data flow(s), a configuration for enabling or disabling the transport layer optimization, a retransmission timeout (RTO) and a round trip time (RTT) of the data flow(s), an impending RTO value of the data flow(s) and a threshold value of a buffer size. Further, the UE includes a New Radio layer (NR L2) receiver configured to enable the transport layer optimization based on the at least one information received from the NR L3 receiver to avoid receiving of duplicate data packets from a Transmission Control Protocol (TCP) sender.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF DRAWINGS

Embodiments herein are illustrated in the accompanying drawings, throughout which like reference letters indicate corresponding parts in the various figures. The embodiments herein will be better understood from the following description with reference to the drawings, in which.

MODE FOR THE INVENTION

Figure 1A:
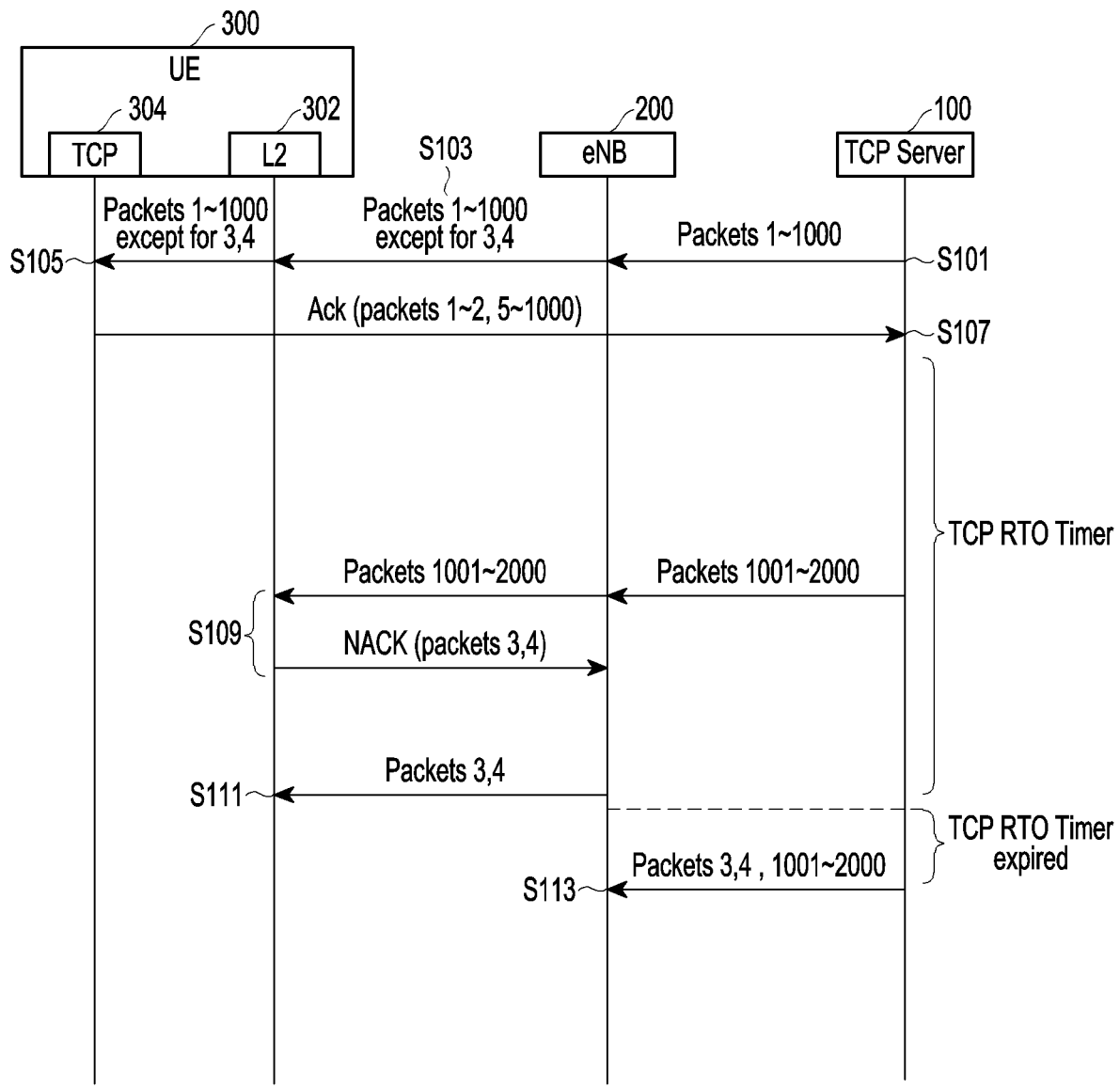
FIG. 1a is a sequence diagram illustrating an existing mechanism for recovering missing packets in a transport layer, according to the prior art.
Figure 1B:
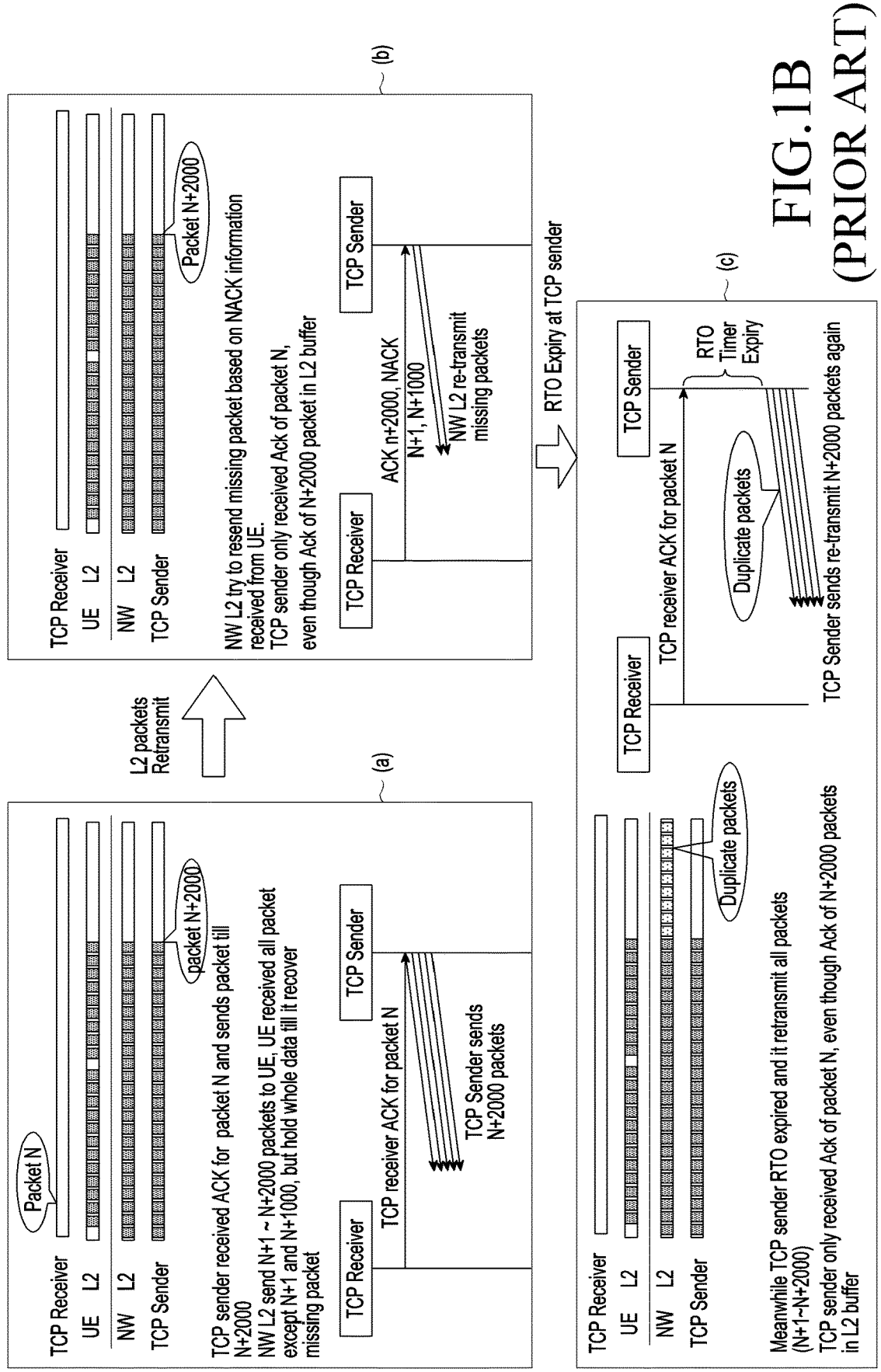
FIG. 1b is an example representation of the existing mechanism for recovering missing packets in the transport layer, according to the prior art.
Figure 2:
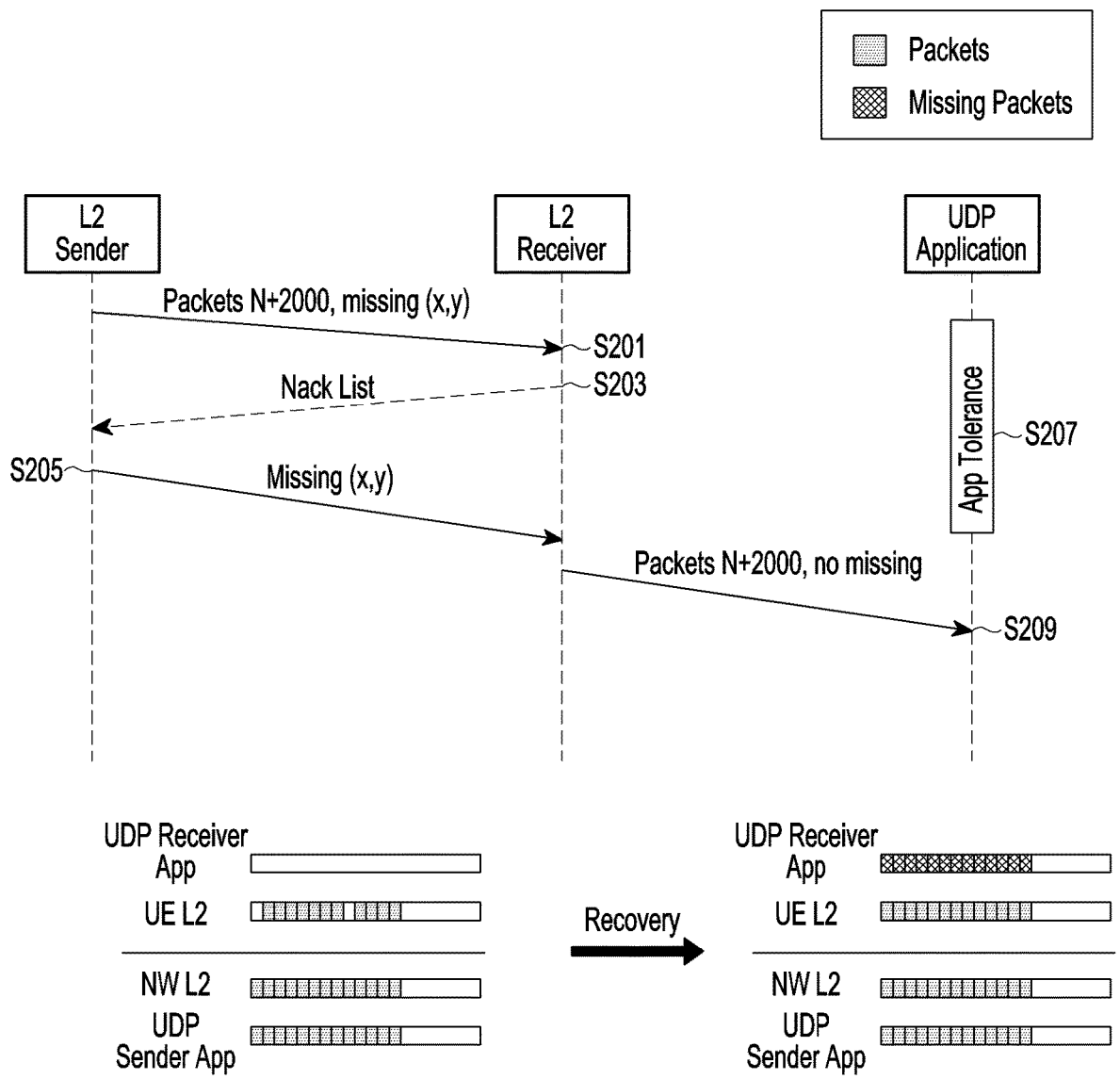
FIG. 2 is a sequence diagram illustrating an existing mechanism for recovering missing packets in a user datagram protocol (UDP), according to the prior art.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The embodiments herein provide a UE for enabling a transport layer optimization using a preemptive cross layer signaling. The UE includes a New Radio layer (NR L3) receiver configured to transmit at least one information to a New Radio layer 2 (NR L2) receiver for transport layer optimization for a data flow(s). The at least one information includes at least one of a configuration for requesting a buffer status of the NR L2 receiver, a policy to inspect data packets of the data flow(s), a configuration for enabling or disabling the transport layer optimization, a retransmission timeout (RTO) and a round trip time (RTT) of the data flow(s), an impending RTO value of the data flow(s) and a threshold value of a buffer size. Further, the UE includes a New Radio layer (NR L2) receiver configured to enable the transport layer optimization based on the at least one information received from the NR L3 receiver to avoid receiving of duplicate data packets from a Transmission Control Protocol (TCP) sender. Referring now to the drawings, and more particularly to FIGS. 3 through 7, where similar reference characters denote corresponding features consistently throughout the figures, there are shown example embodiments.

Figure 3:
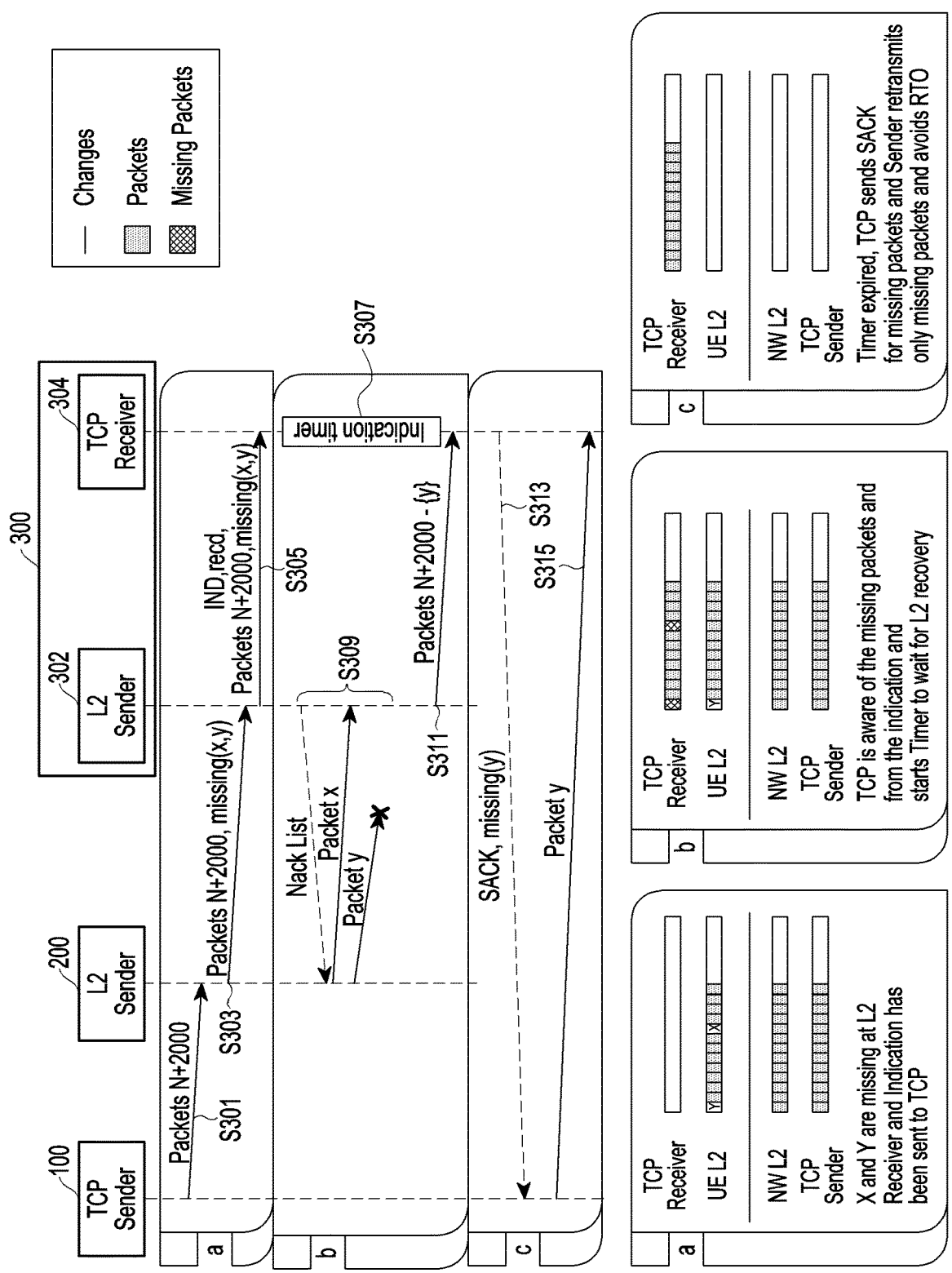
FIG. 3 is a sequence diagram illustrating a method for transport layer optimization using a preemptive cross layer signaling, according to an embodiment as disclosed herein.

FIG. 3 is a sequence diagram illustrating a method for transport layer optimization using a preemptive cross layer signaling, according to an embodiment as disclosed herein.

The embodiments herein provides the method and a UE 300 for transport layer optimization using the preemptive cross layer signaling. The method includes the cross layer signaling optimization between a New Radio Layer 2 receiver (NR L2 receiver) (i.e., UE L2/PDCP layer) 302 of the UE 300 and TCP receiver 304 (a Layer 3 (L3)). The UE 300 performs an operation based on the layer 2 and TCP layer. The NR L2 receiver 302 shares plurality of data packets received from a TCP sender 100 with the TCP receiver 304, which helps the TCP receiver 304 to send an acknowledgement (ACK) in advance which results in avoiding unnecessary data packets retransmission due to retransmission timeout (RTO). The TCP sender 100 may be a TCP server. The TCP sender 100 performs an operation based on the TCP layer.

The method includes transmitting at least one information to the NR L2 receiver 302 for the transport layer optimization for a data flow(s). The at least one information includes at least one of a configuration for requesting a buffer status of the NR L2 receiver 302, a policy to inspect data packets of the data flow(s), a configuration for enabling or disabling the transport layer optimization, a retransmission timeout (RTO) and round trip time (RTT) information of the data flow(s), an impending RTO value of the data flow(s) and a threshold value of a buffer size. Further, the method includes enabling the transport layer optimization based on the at least one information received from the NR L3 receiver 304 to avoid receiving of duplicate data packets from a Transmission Control Protocol (TCP) sender 100.

In an embodiment, enabling the transport layer optimization based on the at least one information received from the NR L3 receiver 304 includes determining the at least one information transmitted by the NR L3 receiver 304 is the configuration for requesting the buffer status of the data flow(s). Further, triggering the buffer status to the NR L3 receiver 304, on determining that the at least one information transmitted is the configuration for requesting the buffer status of the data flow(s). The buffer status includes at least one of information of available data packets, at least one missing data packet of the data flow(s) and timestamp information of the available data packets at the NR L2 receiver 302. The timestamp information of the available data packets is to maintain a Round trip time (RTT) consistency at the NR L3 receiver 304. Further, determining the at least one missing data packet based on the buffer status of the NR L2 receiver. Further, initiating an indication timer at the NR L3 receiver 304 based on the determined at least one missing data packet and wait for the NR L2 receiver 302 to recover the at least one missing data packet before the indication timer expires. Further, sending a selective acknowledgment (SACK) message request to the TCP sender 100 to receive the at least one missing packet, if the at least one missing packet is not recovered before the expiry of the indication timer, wherein the SACK message request is sent only after the expiry of the indication timer based on the triggered buffer status of the NR L2 receiver.

In an embodiment, the method further includes restarting by the L2 receiver the indication timer on triggering the buffer status to the L3 receiver 304.

For example as shown in FIG. 3, the TCP sender 100 sends N+2000 packets to a NR L2 sender 200 (S301). The NR L2 sender 200 may be the eNB. The NR L2 sender 200 performs an operation based on the layer 2. Further, the NR L2 receiver 302 at the UE 300 receives the N+2000 packets out which few packets are missing such as N+1 and N+1000 (S303), so the NR L2 receiver 302 can send only up to N packets to the TCP receiver 304 and further initiates a packets recovery for the N+1 and the N+2000 packets (S305). However, the NR L2 receiver 302 at the UE 300 also communicates the NR L3/TCP receiver 304 about a receipt of future packets and missing packets. Further, the TCP receiver 304 at TCP layer starts the indication timer e.g. IND and waits for the NR L2 receiver 302 to recover the missing packets (S307). The value of indication timer decided based on estimated possible retransmission timeout (RTO) at the TCP sender 100. If the NR L2 receiver 302 performs recovery of missing packets (N+1 and N+1000) before the expiry of the indication timer (S309), the TCP receiver 304 can work normally by sending an acknowledgement (ACK) to the recovered packets received from the NR L2 receiver 302. For the recovery, L2 sender (302) transmits NACK list related to packet x and packet y to the L2 sender (200). The L2 sender (200) transmits packet x and packet y. However, the packet y is missed. The L2 sender (302) only receives packet y from the L2 sender (200). If the indication timer expires before the NR L2 receiver 302 recovery (S311), the TCP receiver 304 can send the SACK message request to the TCP sender 100 and mark missing packets numbers in an ACK missing packet information e.g. recd which is reported by the NR L2 receiver 302 (S313). Since, the TCP receiver 304 sends the ACK in well advance (before possible RTO at the TCP sender), so that the TCP RTO can be avoided which reduce the unnecessary retransmission of the data packets. However, by sending the SACK, the TCP sender 100 can retransmit only missing packet (S315) as shown in the FIG. 3.

Figure 4:
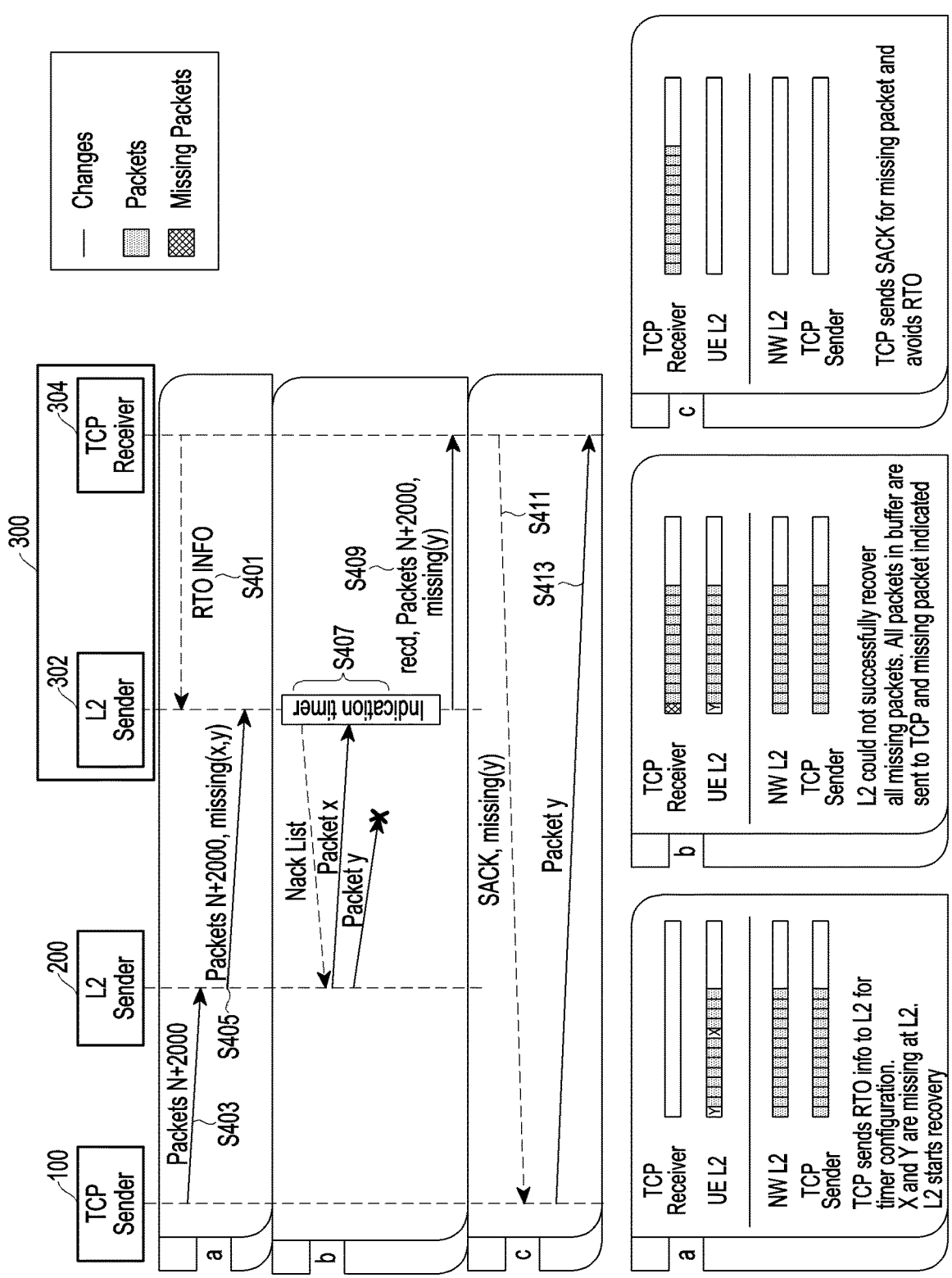
FIG. 4 is a sequence diagram illustrating a preemptive cross layer signaling between a NR L2 receiver and a TCP receiver by sharing information of estimated possible expiry of TCP RTO to the NR L2 receiver, according to an embodiment as disclosed herein.

FIG. 4 is a sequence diagram illustrating the preemptive cross layer signaling between the NR L2 receiver 302 and the TCP receiver 304 (i.e. NR L3) by sharing information of estimated possible expiry of TCP RTO to the NR L2 receiver 302, according to an embodiment as disclosed herein.

The transport layer optimization using the preemptive cross layer signaling takes place between the NR L2 receiver 302 and the NR L3/TCP receiver 304 by sharing information of estimated possible expiry of the TCP RTO at the TCP sender 100 for ongoing data transmission in advance. Based on this information the NR L2 receiver 302 can transmit received buffer to the TCP receiver 304 and this helps the TCP receiver 304 to send an ACK in advance which will avoid unnecessary packets retransmission due to the RTO. The TCP receiver 304 informs the possible TCP RTO value to the NR L2 receiver 302.

The embodiments herein provides the method for enabling the transport layer optimization based on the at least one information received from the NR L3 receiver 304. The method includes determining the at least one information transmitted by the NR L3 is the RTO and the RTT of the data flow(s). Further, the method includes determining an indication timer (i.e., estimated possible expiry of the TCP RTO) for the data flow(s) based on the RTO and the RTT to recover at least one missing data packet in the data flow(s) before the expiry of the indication timer. Further, the method includes transmitting available data packets of the data flow(s) and the at least one missing data packet information to the NR L3 receiver 304 after the expiry of the indication timer. Further, the method includes sending the SACK message request to the TCP sender 100 to receive the at least one missing data packet from the TCP sender 100 based on the available data packets and the at least one missing data packet information received from the NR L2 receiver 302.

For example as shown in FIG. 4, the TCP receiver 304 sends RTO information to the L2 receiver (302) for the indication timer configuration (S401). The TCP sender 100 sends N+2000 packets to the NR L2 sender 200 (S403). Further, the NR L2 receiver 302 at the UE 300 receive packets (i.e., N+2000 packets) out of which few packets are missing such as N+1(Y) and N+1000(X) (S405). The NR L2 receiver 302 at the UE 300 initiate missing data packets recovery and also start the indication timer (i.e., estimated possible expiry of the TCP RTO) based on inspection of buffered/received data packets (S407). For the recovery, L2 sender (302) transmits NACK list related to packet x and packet y to the L2 sender (200). The L2 sender (200) transmits packet x and packet y. However, the packet y is missed. The L2 sender (302) only receives packet y from the L2 sender (200). If the NR L2 receiver 302 recovers the missing packets before the expiry of the indication timer, the TCP receiver 304 can work normally by sending an ACK to the recovered missing data packets received from the NR L2 receiver 302. If the indication timer expires before the NR L2 receiver 302 recovers the missing packets, then the NR L2 receiver 302 of the UE 300 sends all available received data packets i.e. N+2000 packets except N+1(Y) and the missing data packet information (recd) to the TCP layer/TCP receiver 304 (S409). Further, the TCP receiver 304 sends the SACK (selective acknowledgement) message request to the TCP sender 100 along with the missing packets numbers (S411). Further, the TCP receiver 304 receives the missing packets i.e. N+1(Y) in response to the SACK message request (S413). Since, the TCP receiver 304 sends the ACK well in advance (before possible RTO at TCP sender 100), so that the TCP RTO can be avoided which reduce the unnecessary retransmission of packets. With the help of the SACK message request, the TCP sender 100 can retransmit only the missing packets.

Figure 5:
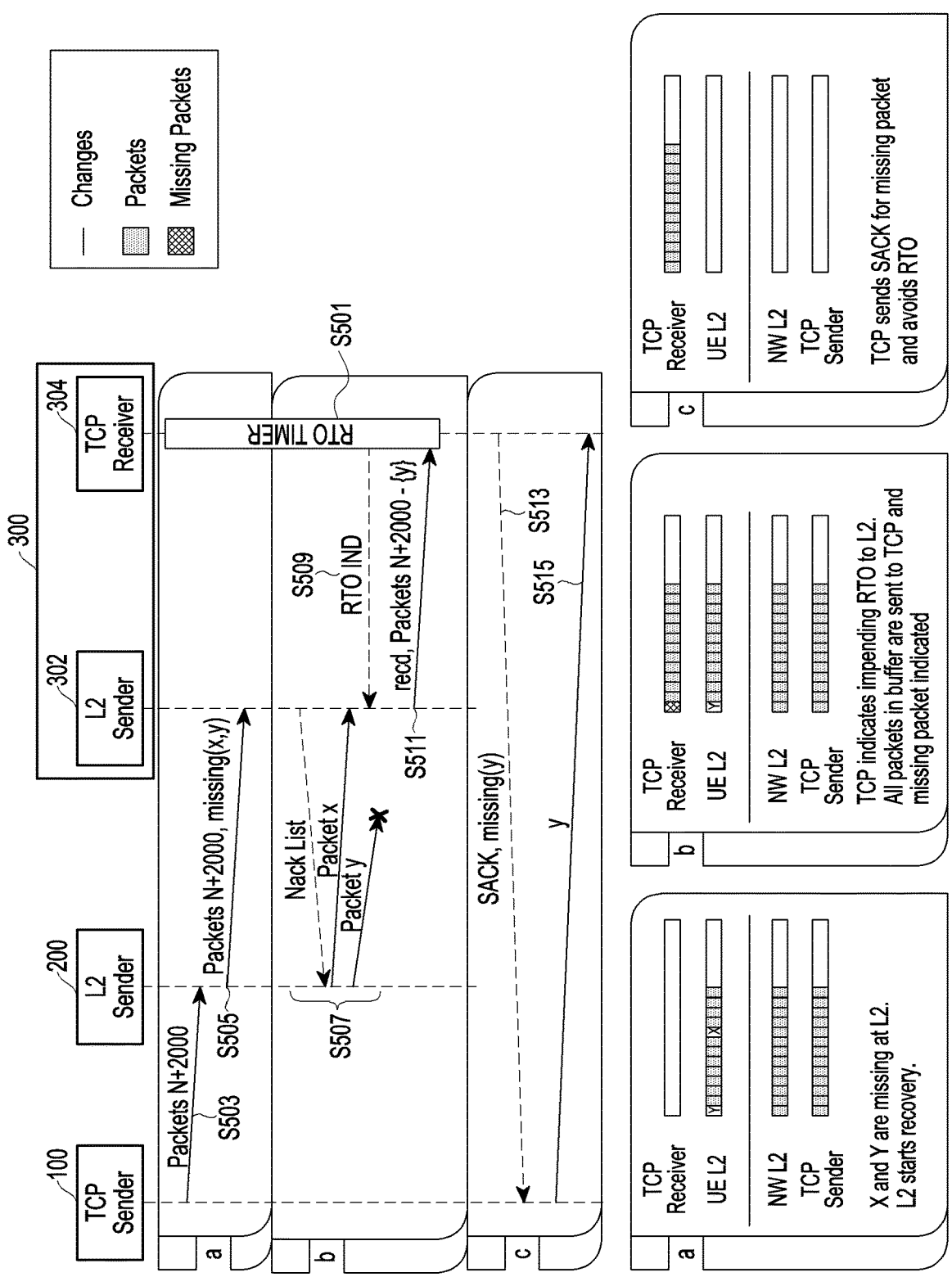
FIG. 5 is a sequence diagram illustrating a preemptive cross layer signaling between a NR L2 receiver and a TCP receiver, wherein the TCP receiver indicates an estimated possible expiry of TCP RTO to the NR L2 receiver to send available packets to the TCP receiver, according to an embodiment as disclosed herein.

FIG. 5 is a sequence diagram illustrating the preemptive cross layer signaling between the NR L2 receiver 302 and the TCP receiver 304, wherein the TCP receiver 304 indicates an estimated possible expiry of the TCP RTO to the NR L2 receiver 302 to send available packets to the TCP receiver 304, according to an embodiment as disclosed herein.

The embodiments herein provide the method for enabling the transport layer optimization based on the at least one information received from the NR L3 receiver 304. The method includes determining the at least one information transmitted by the NR L3 receiver 304 is the impending RTO value of the data flow(s). The impending RTO value indicates a threshold value of the timer/indication timer of the RTO. Further, the method includes sending available data packets of the data flow(s) at the NR L2 receiver 302 based on the impending RTO value received from the NR L3 receiver 304. Further, the method includes sending the SACK message request to the TCP sender 100 to receive at least one missing data packet in the data flow(s) from the TCP sender 100 based on the available data packets received from the NR L2 receiver 302. Further, the method includes restarting by the NR L3 receiver 304 the threshold timer on sending the SACK message.

As shown in the FIG. 5, the transport layer optimization using the preemptive cross layer signaling is performed between the NR L2 receiver 302 and the TCP receiver 304 of the Transport layer. The TCP receiver 304 estimates the possible expiry of the TCP RTO at TCP sender 100 for an ongoing data flow(s) and start the indication timer/threshold timer, when a last ACK sent (S501). The TCP sender 100 sends N+2000 data packets to the NR L2 sender 200 (S503). Further, the NR L2 receiver 302 at the UE 300 receives packets (i.e., N+2000 packets) out of which few data packets are missing such as N+1(Y) and N+1000(X) (S505). Further, the NR L2 receiver 302 on determining the missing data packets (i.e., N+1(Y), N+1000(X)), initiates a recovery procedure for the missing data packets (S507). For the recovery, L2 sender (302) transmits NACK list related to packet x and packet y to the L2 sender (200). The L2 sender (200) transmits packet x and packet y. However, the packet y is missed. The L2 sender (302) only receives packet y from the L2 sender (200). If the TCP receiver 304 receives the missing packets before the indication timer expiry, the TCP receiver 304 can work normally by sending an ACK to the received missing packets and the indication timer gets restarted. Before the indication timer expiry, the NR L3 receiver 304 sends the RTO value i.e. the threshold value of the indication timer to the L2 receiver (302) (S509). If the indication timer expires at the TCP receiver 304 before the NR L2 receiver 302 recovers the missing data packets, the TCP receiver 304 request the NR L2 receiver 302 to send all the available data packet i.g. N+2000 packets except for N+1(Y) packet the missing data packet information (recd) to the TCP receiver 304 based on the RTO value (S511). Further, the TCP receiver 304 sends a SACK message request to the TCP sender 100 by indicating the missing packets numbers i.g. N+1(Y) in an ACK missing packet information (S513). The TCP receiver 304 receives missing packet i.g. N+1(Y) packet from the TCP sender (100) (S515). Since, the TCP receiver 304 sends the ACK well in advance (i.e., before the expiry of the possible RTO at the TCP sender 100), so that the TCP RTO can be avoided which reduce the unnecessary retransmission of the packets. With the help of the SACK request message, the TCP sender 100 retransmit only the missing data packets.

Figure 6:
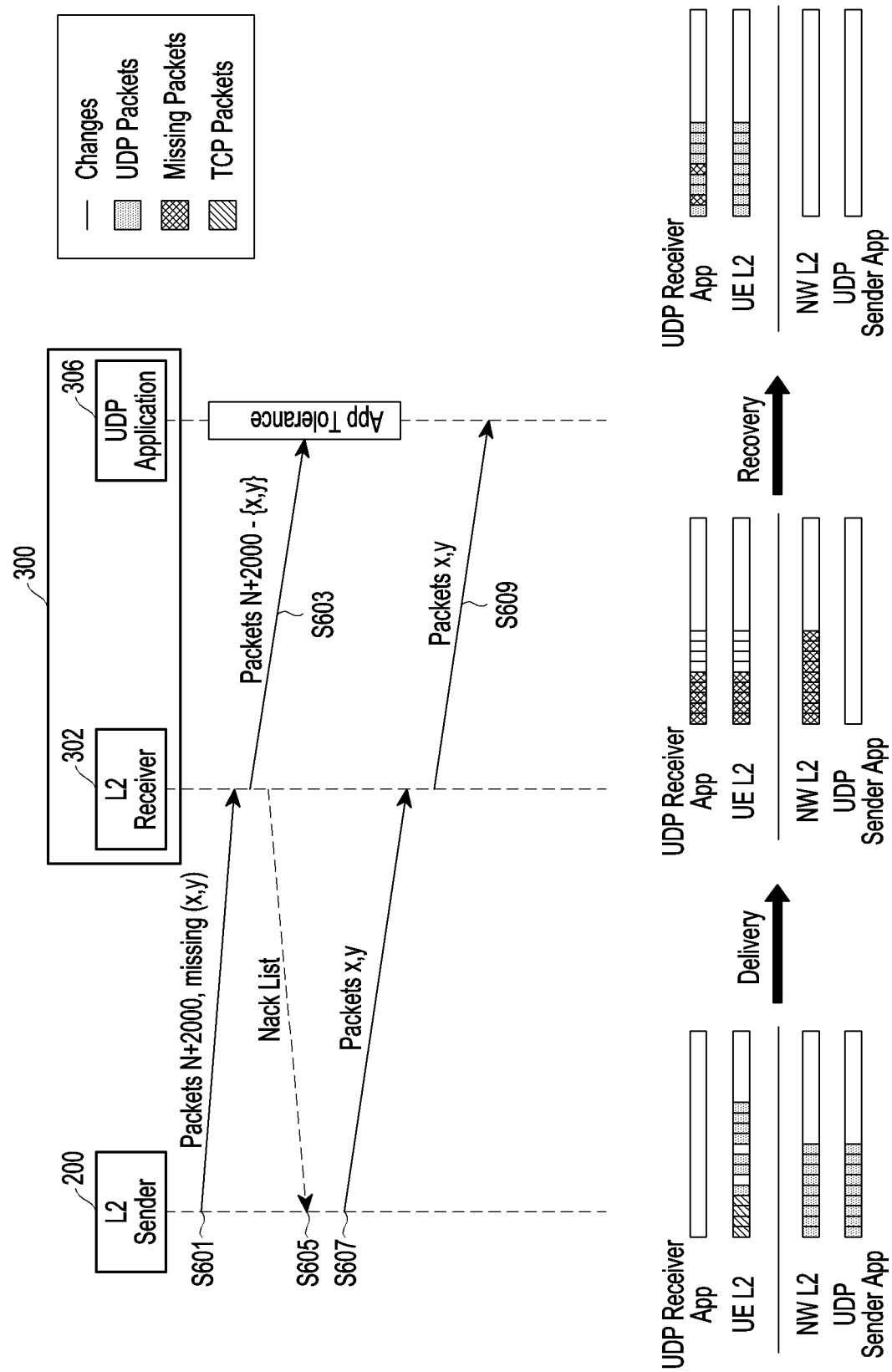
FIG. 6 is a sequence diagram illustrating a preemptive cross layer signaling between a NR L2 receiver and a User Datagram protocol (UDP receiver application), according to an embodiment as disclosed herein.

FIG. 6 is a sequence diagram illustrating a preemptive cross layer signaling between the NR L2 receiver 302 and a User Datagram protocol (UDP receiver application) 306, according to an embodiment as disclosed herein.

The preemptive cross layer signaling between the NR L2 receiver 302 and the UDP receiver application 306. The embodiments herein provides a deep packet inspection (DPI) to check UDP packets and preemptively delivery the UDP packets to the transport layer. Further, the embodiments herein help the UDP 306 to deliver more packets quickly to an application and avoid discarding of an entire range of packets due to errors in a few packets.

The embodiments herein provide the method for enabling the transport layer optimization based on the at least one information received from the NR L3 receiver 304. The method includes determining the at least one information transmitted is the policy (i.e., DPI) to inspect data packets of the data flow(s). Further, the method includes determining whether the data packets are TCP packets or UDP packets, on determining that the at least one information transmitted is the policy to inspect data packets of the data flow(s). Further, the method includes transmitting the available packets at the NR L2 receiver 302 to the NR L3 receiver 304, on determining that the data packets are UDP.

As shown in the FIG. 6, a UDP server (not shown) sends N+2000 packets to the NR L2 sender 200. Further, the NR L2 receiver 302 at the UE 300 receives the N+2000 data packets out which few packets are missing such as N+1 and N+1000 (S601). Further, the NR L2 receiver 302 inspect the data packets received and if the NR L2 receiver 302 determines that the data packets are UDP then the NR L2 receiver 302 pre-emptively delivers all the buffered packets (S603) and sends the NACK list to recover the missing data packets (S605). If the NR L2 receiver 302 recovers the missing data packets (S607), then the NR L2 receiver 302 delivers the recovered missing data packets to the UDP application 306 (S609). Further, if the UDP app 306 receives those missing packets within the Application threshold period, it will have sufficient time to use the missing packets. In case, if the missing packets recovery is not sufficiently fast and the packet could not be successfully recovered before the application threshold, then the unrecoverable packets may not be delivered to the UDP application 306. However, all the available packets are delivered successfully because of the preemption. Further, the UDP app 306 can utilize them on time.

The embodiments herein provides the method for enabling the transport layer optimization based on the at least one information received from the NR L3 receiver 304. The method includes determining the at least one information transmitted is the threshold value of the buffer size. Further, the method includes transmitting the available packets at the NR L2 receiver 302 to the NR L3 receiver 304, when the buffer status of the NR L2 receiver 302 matches with the threshold value of the buffer size.

The embodiments herein reduces duplicate packet transmission and hence reduces cost and power consumptions. The embodiments herein also reduces effective latency experienced by tan applications which uses network connectivity.

Figure 7:
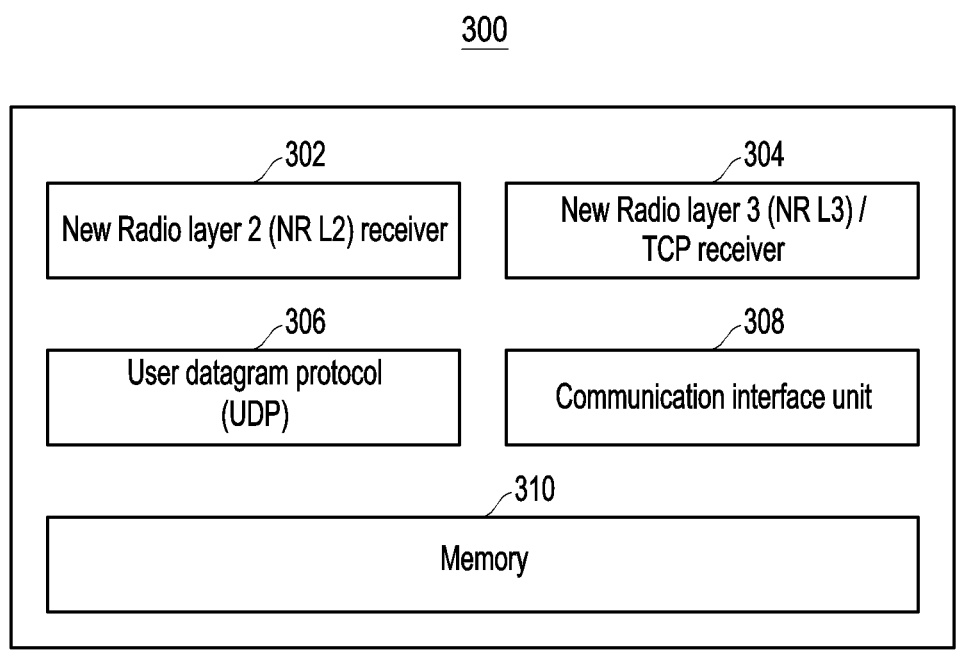
FIG. 7 is a block diagram illustrating various unit of a User equipment (UE) for transport layer optimization using a preemptive cross layer signaling, according to an embodiment as disclosed herein.

FIG. 7 is a block diagram illustrating various unit of the UE 300 for transport layer optimization using the preemptive cross layer signaling, according to an embodiment as disclosed herein.

The embodiments herein provide methods and the UE 300 for of transport layer optimization using the preemptive cross layer signaling. In an embodiment, the UE 300 can be at least one of, but not restricted to, a mobile phone, a smartphone, tablet, a phablet, a personal digital assistant (PDA), a laptop, a computer, a wearable computing device, an Internet of Things (IoT) device, smart television (TV) and any other electronic device which has a capability of receiving data from a network. The UE 300 includes the NR L2 receiver/PDCP 302 and the TCP receiver (NR L3) 304, UDP/UDP application 306, a communication interface unit 308 and a memory 310.

The NR L3 receiver 304 can be configured to transmit at least one information to the NR L2 receiver 302 for transport layer optimization for the data flow(s). The at least one information includes at least one of the configuration for requesting the buffer status of the NR L2 receiver 302, the policy to inspect data packets of the data flow(s) (i.e., to inspect whether the data packets are TCP OR UDP packets), the configuration for enabling or disabling the transport layer optimization, the retransmission timeout (RTO) and the round trip time (RTT) information of the data flow(s), the impending RTO value of the data flow(s) and the threshold value of the buffer size. The NR L2 receiver 302 can be configured to enable the transport layer optimization based on the at least one information received from the NR L3 receiver 304 to avoid receiving of duplicate data packets form the TCP sender 100.

In an embodiment, the UE 300 configured to enable the transport layer optimization based on the at least one information received from the NR L3 receiver 304 by determining the at least one information transmitted by the NR L3 is the configuration for requesting the buffer status of the data flow(s). Further, triggering the buffer status to the NR L3 receiver 304, on determining that the at least one information transmitted is the configuration for requesting the buffer status of the data flow(s). The buffer status includes at least one of information about the available data packets, at least one missing data packet of the data flow(s) and the timestamp information of the available data packets at the NR L2 receiver 302. Further, determining the at least one missing data packet based on the buffer status of the NR L2 receiver 302. Further, initiating the indication timer at the NR L3 receiver 304 based on the determined at least one missing data packet and wait for the NR L2 receiver 302 to recover the at least one missing data packet before the indication timer expires. Further, sending the SACK message request to the TCP sender 100 to receive the at least one missing packet, if the at least one missing packet is not recovered before the expiry of the indication timer. The SACK message request is sent only after the expiry of the indication timer based on the triggered buffer status of the NR L2 receiver. In an embodiment, the method further comprises restarting by the L2 receiver 302 the indication timer on triggering the buffer status to the NR L3 receiver 304. In an embodiment, the timestamp information of the available data packets is to keep the RTT consistency at the NR L3 receiver 304.

In an embodiment, the UE 300 configured to enable the transport layer optimization based on the at least one information received from the NR L3 receiver 304 by determining the at least one information transmitted by the NR L3 304 is the RTO and the RTT of the data flow(s). Further, determining an indication timer for the data flow(s) based on the RTO and the RTT to recover at least one missing data packet in the data flow(s) before the expiry of the indication time. Further, transmitting available data packets of the data flow(s) and the at least one missing packet information to the NR L3 receiver 304 after the expiry of the indication timer. Further, sending the SACK message request to the TCP sender 100 to receive the at least one missing packet from the TCP sender 100 based on the available data packets and the at least one missing packet information received from the NR L2 receiver 302.

In an embodiment, the UE 300 configured to enable the transport layer optimization based on the transmitted at least one information received from the NR L3 receiver 304 by determining the at least one information transmitted by the NR L3 receiver 304 is the impending RTO value of the data flow(s). The impending RTO value indicates the threshold timer of the RTO. Further, sending available data packets of the data flow(s) at the NR L2 receiver 302 based on the impending RTO value received from the NR L3 receiver 304. Further, sending the SACK message request to the TCP sender to receive at least one missing data packet in the data flow(s) from the TCP sender 100 based on the available data packets received from the NR L2 receiver 302. In an embodiment, the UE 300 further configured to restart the threshold timer on sending the SACK message.

In an embodiment, the UE 300 configured to enable the transport layer optimization based on the at least one information received from the NR L3 receiver 304 by determining the at least one information transmitted is the policy to inspect data packets of the data flow(s). Further, determining whether the data packets are TCP packets or UDP packets, on determining that the at least one information transmitted is the policy to inspect data packets of the data flow(s). Further, transmitting the available packets at the NR L2 receiver 302, on determining that the data packets are UDP.

In an embodiment, the UE 300 configured to enable the transport layer optimization based on the at least one information received from the NR L3 receiver by determining the at least one information transmitted is the threshold value of the buffer size and transmitting the available packets at the NR L2 receiver 302 to the NR L3 receiver 304, when the buffer status of the NR L2 receiver 302 matches with the threshold value of the buffer size.

The communication interface unit 308 can be configured to establish a communication between the UE 300 and the network (not shown) for data transfer.

The memory 310 can configured store received plurality of data packets from the TCP sender 100. The memory 310 can also be configured to store information about the one more missing data packets. The memory 310 may include one or more computer-readable storage media. The memory 310 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 310 may, in some examples, be considered a non-transitory storage medium. The term "non-transitory" may indicate that the storage medium is not embodied in a carrier wave or a propagated signal. However, the term "non-transitory" should not be interpreted to mean that the memory 310 is non-movable. In some examples, the memory 310 can be configured to store larger amounts of information than the memory. In certain examples, a non-transitory storage medium may store data that can, over time, change (e.g., in Random Access Memory (RAM) or cache).

FIG. 7 shows exemplary units of the UE 300, but it is to be understood that other embodiments are not limited thereon. In other embodiments, the UE 300 may include less or more number of units. Further, the labels or names of the units are used only for illustrative purpose and does not limit the scope of the embodiments herein. One or more units can be combined to perform same or substantially similar function in the UE 300.

The embodiments disclosed herein can be implemented through at least one software program running on at least one hardware device and performing network management functions to control the elements. The elements shown in FIG. 7 can be at least one of a hardware device, or a combination of hardware device and software module.

The foregoing description of the specific embodiments will so fully reveal the general nature of the embodiments herein that others can, by applying current knowledge, readily modify and/or adapt such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

The invention claimed is:

1. A method for enabling a transport layer optimization in a user equipment (UE) using a preemptive cross layer signaling, the method comprising:
   transmitting, by a layer 3, at least one information to a layer 2 for a transport layer optimization for one or more data flows; and
   enabling, by the layer 2, the transport layer optimization based on the at least one information received from the layer 3 to avoid receiving duplicate data packets from a transmission control protocol (TCP) server,
   wherein, in response to determining that the at least one information transmitted by the layer 3 is configuration for requesting a buffer status of the one or more data flows in the layer 2, the enabling of the transport layer optimization based on the at least one information received from the layer 3 comprises:
      triggering, by the layer 2, the buffer status to the layer 3 based on the determination, wherein the buffer status includes at least one of an information of available data packets, at least one missing data packet of the one or more data flows, or timestamp information of the available data packets at the layer 2;
      determining, by the layer 3, the at least one missing data packet based on the buffer status of the layer 2;
      initiating, by the layer 3, an indication timer at the layer 3 based on the determined at least one missing data packet and waiting for the layer 2 to recover the at least one missing data packet before the indication timer expires; and
      transmitting, by the layer 3, a selective acknowledgment (SACK) message request to the TCP server to receive the at least one missing data packet, in response that the at least one missing data packet is not recovered before the indication timer expires, wherein the SACK message request is transmitted after the indication timer expires based on the triggered buffer status of the layer 2.

2. The method of claim 1, wherein the at least one information includes at least one of a configuration for requesting a buffer status of the one or more data flows in the layer 2, a policy to inspect data packets of the one or more data flows, a configuration for enabling or disabling the transport layer optimization, a retransmission timeout (RTO) and a round trip time (RTT) of the one or more data flows, an impending RTO value of the one or more data flows, or a threshold value of a buffer size.

3. The method of claim 1, wherein the method further comprises restarting by the layer 2 the indication timer on triggering the buffer status to the layer 3.

4. The method of claim 1, wherein the timestamp information is for maintaining a round trip time (RTT) consistency of the one or more data flows at the layer 3.

5. The method of claim 1, wherein, in response to determining that the at least one information transmitted by the layer 3 is a retransmission timeout (RTO) and a round trip time (RTT) of the one or more data flows, the enabling of the transport layer optimization based on the at least one information received from the layer 3 comprises:
   initiating, by the layer 2, the indication timer for the one or more data flows based on the RTO and the RTT to recover the at least one missing data packet in the one or more data flows before the indication timer expires;
   transmitting, by the layer 2, the available data packets of the one or more data flows and information on the at least one missing data packet information to the layer 3 after the indication timer expires; and
   transmitting, by the layer 3, the SACK message request to the TCP server to receive the at least one missing data packet from the TCP server based on the available data packets and the information on the at least one missing data packet received from the layer 2.

6. The method of claim 1,
   wherein, in response to determining that the at least one information transmitted by the layer 3 is an impending retransmission timeout (RTO) value of the one or more data flows, the enabling of the transport layer optimization based on the at least one information received from the layer 3 comprises:
      transmitting, by the layer 2, the available data packets of the one or more data flows at the layer 2 to the layer 3 based on the impending RTO value received from the layer 3, and
      transmitting, by the layer 3, the SACK message request to the TCP server to receive the at least one missing data packet in the one or more data flows from the TCP server based on the available data packets received from the layer 2, and
   wherein the impending RTO value indicates a threshold timer of the RTO.

7. The method of claim 6, wherein the method further comprises:
   restarting, by the layer 3, the threshold timer on transmitting the SACK message.

8. The method of claim 1, wherein, in response to determining that the at least one information transmitted by the layer 3 is a policy to inspect data packets of the one or more data flows, the enabling of the transport layer optimization based on the at least one information received from the layer 3 comprises:
   determining, by the layer 2, whether the data packets are TCP packets or user datagram protocol (UDP) packets; and
   transmitting, by the layer 2, the available packets at the layer 2 to the layer 3, on determining that the data packets are UDP.

9. The method of claim 1, wherein, in response to determining that the at least one information transmitted by the layer 3 is a threshold value of a buffer size, the enabling of the transport layer optimization based on the at least one information received from the layer 3 comprises:
   transmitting, by layer 2, the available packets at the layer 2 to the layer 3, when the buffer status of the layer 2 matches with the threshold value of the buffer size.

10. A User Equipment (UE) for enabling a transport layer optimization using a preemptive cross layer signaling, the UE comprising:
   a layer 3 configured to:
      transmit at least one information to a layer 2 for transport layer optimization for one or more data flows; and
   the layer 2 configured to:
      enable the transport layer optimization based on the at least one information received from the layer 3 to avoid receiving duplicate data packets from a Transmission Control Protocol (TCP) server, wherein, in response to determining that the at least one information transmitted by the layer 3 is configuration for requesting a buffer status of the one or more data flows in the layer 2:
- the layer 2 is further configured to trigger the buffer status to the layer 3 based on determination, wherein the buffer status includes at least one of an information of available data packets, at least one missing data packet of the one or more data flows, or timestamp information of the available data packets at the layer 2, and
- the layer 3 is further configured to:
  - determine the at least one missing data packet based on the buffer status of the layer 2,
  - initiate an indication timer at the layer 3 based on the determined at least one missing data packet and waiting for the layer 2 to recover the at least one missing data packet before the indication timer expires, and
  - transmit a selective acknowledgment (SACK) message request to the TCP server to receive the at least one missing data packet, in response that the at least one missing data packet is not recovered before the indication timer expires, wherein the SACK message request is transmitted after the indication timer expires based on the triggered buffer status of the layer 2.

11. The UE of claim 10, wherein the at least one information includes at least one of a configuration for requesting a buffer status of the one or more data flows in the layer 2, a policy to inspect data packets of the one or more data flows, a configuration for enabling or disabling the transport layer optimization, a retransmission timeout (RTO) and a round trip time (RTT) of the one or more data flows, an impending RTO value of the one or more data flows, or a threshold value of a buffer size.

12. The UE of claim 10, wherein, in response to determining that the at least one information transmitted by the layer 3 is a retransmission timeout (RTO) and a round trip time (RTT) of the one or more data flows, the layer 2 is further configured to:
- initiate an indication timer for the one or more data flows based on the RTO and the RTT to recover the at least one missing data packet in the one or more data flows before the indication timer expires, and
- transmit the available data packets of the one or more data flows and information on the at least one missing data packet to the layer 3 after the indication timer expires, and the layer 3 is further configured to:
- transmit the SACK message request to the TCP server to receive the at least one missing data packet from the TCP server based on the available data packets and the information on the at least one missing data packet received from the layer 2.

13. The UE of claim 10,
wherein, in response to determining that the at least one information transmitted by the layer 3 is an impending retransmission timeout (RTO) value of the one or more data flows,
- the layer 2 is further configured to transmit the available data packets of the one or more data flows at the layer 2 based on the impending RTO value received from the layer 3, and
- the layer 3 is further configured to transmit the SACK message request to the TCP server to receive the at least one missing data packet in the one or more data flows from the TCP server based on the available data packets received from the layer 2, and
wherein the impending RTO value indicates a threshold timer of the RTO.

* * * * *